though frequently applied in the breweries

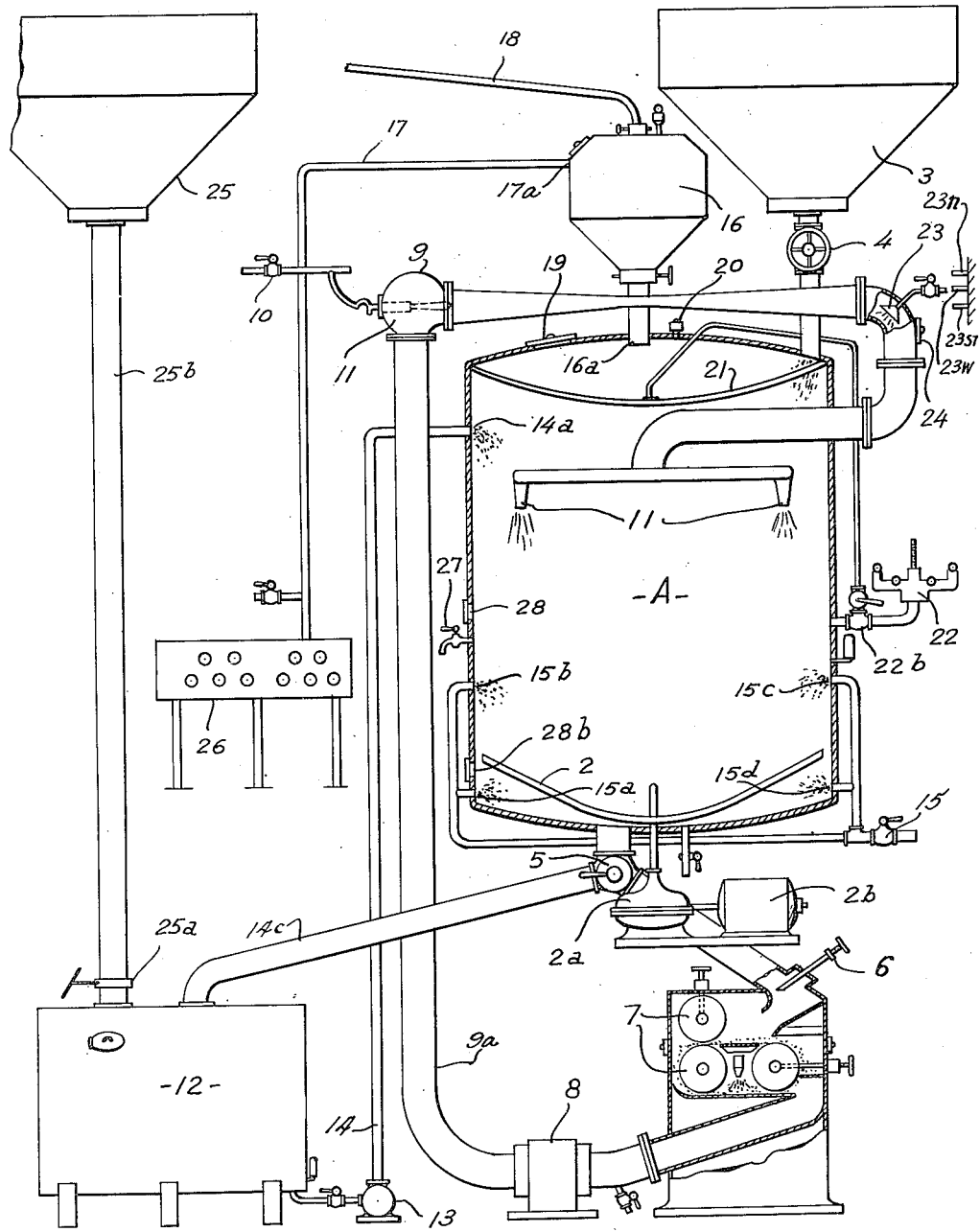

UNITED STATES PATENT OFFICE 2,592,170

BREWER'S CEREAL COOKER

Ferdinand Muller, Elmhurst, N. Y.

Application June 8, 1950, Serial No. 166,892

3 Claims. (Cl. 99—237)

This invention relates to brewers' cereal cookers and has for its object to combine such a cooker with novel means which will expedite the brewing process and also improve the quality of the product.

These novel means accelerate the grinding, swelling and cooking periods, necessary for efficient dextrination of the grain starch, by the provision of a systemized flow to eliminate the rehandling of the material. The use of an improved fluid milling reduction requires less power than dry milling, with the same equipment and power as the effects of the milling and conveying are carried out in one passage. By using a heat vapor system and the injection of an acid catalyst during the hydrolization stage, a better extraction and subsequent break in the brew kettle is obtained. By the combination with the cooker grain of ground seedless hops and malt and malt infusion, an improvement in the taste of the beer and in its foamstability, also a more exacting anabolism of nutritive material by the yeast is obtained. The fine clean taste is further accentuated by the absence of thermal inactivation of lipase, since the malt infusion is used for liquefaction and dextrination in the preparation of this brewer cereal mash.

The invention consists, in the provision of a fluid grinding means below the cereal cooker and discharging its contents into the cereal cooker by a flash distributor to rupture the starch due to the velocities produced by the Venturi tube, and the explosion or flash reduction of the grains, when discharged from a high pressure in the tube to the relatively low pressure in the cooker. Thus, by a repeated circulation from the cooker to the fluid grinder, and through the Venturi and its distributor, a systemized flow for rehandling of the broken grains is obtained. The use of the steam in the Venturi breaks down the starch granules and prepares it for conversion.

The invention will be further described, an embodiment shown in the drawings, and the invention will be finally pointed out in the claims.

The accompanying drawing in diagrammatic form illustrates the invention described herein.

Referring to the drawings, the cooker vessel A, has an agitator 2 operated by a gear 2a and a motor 2b. The rice grain bin 3 supplies rice through the dumper scale 4. A three way valve 5, a feed control 6, a fluid reduction mill 7, with steam injector 8t. and a booster pump 8 is provided. A conduit 9a passes from the booster pump 8 to a Venturi flash tube 9, controlled by a steam valve 10, to force the slurry through the flash tube nozzle 11. A malt mash tank 12, with an infusion pump 13, and main line 14 is discharged into the cooking vessel A at 14a. An infusion tank 16 discharges into the vessel A at 16a. A $CO_2$ feeder line 17 discharges into the tank 16 at 17a. A feeder line 18 supplies a seedless hop charge from the hop grinder to the tank 16. A man hole 19 is provided at the top of the vessel A. A blow off 20 is provided at the top of the vessel A.

Steam is admitted to the vessel A by opening valve 15, and through the injectors 15a, 15b, 15c and 15d, in the interior of the lower end of the vessel A.

A control board 26 for the temperature and pressures at different points is provided. A petcock 27 along the vertical wall of the vessel A enables samples to be taken. Sight glasses 28 and 28b along the wall of vessel A enable the general reactions to be observed.

A sparger 21, with water heated at the mixer 22, with a two way valve 22b, washes the remainder of the cooker mash down and is ready for the next charge. Cooling is obtained from the same station 22 and valve 22b. A sprayer 23 is at the top of the vessel A. A cover 24 enables the Venturi tube to be cleaned.

A ground malt hopper 25 supplies its contents through the tube 25b and shutter 25a to the tank 12.

The form of the invention illustrated in the drawings shows a composite picture of the entire equipment of an improved brewers' cereal cooker with fluid milling reduction. The cooker-vessel is connected systematically with a combination milling and lifting pump, a Venturi type steam flash tube, effecting lift power, and increase in swelling and rupture rate of the starch cells. With these accelerated actions, the power and work of the dry milling is saved and the transfer through the thermal and enzymatic reactions of the cereal, slurry mash is obtained in shorter periods.

The catalyst, nitrogen gas, is used conjunctively at the very minute rate of 0.20 cu. ft. per barrel of liquid slurry and is injected through the sparger 23, to adjust the pH and reduce the activity of oxygen. The air-oxygen affects the 1–1.5% fat and oil content of the rice or corn meal. Entrained oxygen in the slurry mash causes foaming and the fat globules to produce undesirable off flavors. The composition of air over manufacturing territory differs, from the natural and vegetative land, making de-aeration or diluting methods, a desirable process to obtain a higher quality product. The connections to the sparger 23 are interchangeable to 23 n. for nitrogen gas, to 23 W. for water and 23 St. for steam.

The initial breakdown stage of the starch and the coagulable albuminoids from the malt, grains and the seedless hops, is achieved by means of malt and hop enzymes, at lower temperature and atmospheric pressure. Reduction, extraction and transformation of the modified starch and proteins, are accelerated by the passage, through the fluid reduction mill and the Venturi steam flash tube, compounding the effects of heat-vapor and the catalyst injected in this zone and the cooker-vessel pressure adjusted for best reaction. The presence of a malt infusion and ground, seedless hops in the mash, are capable of coagulating the albumens. The resulting albumenoids are essential as yeast food and for the stability of the beer foam. The ground, hop leaves act as a filter medium, in excess of the malt husks filter-bed in the lauter-tub, where a lower percentage of malt from the conventional standard practice is used. Some of the hop cellulose and hop carbohydrates will be digested, thus adding to the yield, taste and clarification of the mashes and the final beer.

The drawing illustrates the entire equipment of the improved vessel, used as a grain-steeper for initial swelling of the grains, in preparation for fluid milling reduction, by a combination of fluid grinding and lifting pump, to a connected heating zone of a Venturi steam flash tube and the cooker-vessel itself.

The operation is follows:

The tank A presents a pressure brewers' cereal cooker vessel with inlets for grain, water, malt infusion, seedless ground hops, steam and $CO_2$ gas.

The agitator 2 driven, by gear 2a and motor 2b, mixes raw grains such as broken rice or corn, with water, and a charge of seedless hops, plus malt infusion for saccharification and liquefaction. From the grain-bin 3, rice passes through the dumper-scale 4 into the cooker and is mixed with calculated mash-water present in the cooker, by means of the agitator 2 in motion. After 15 minutes' steeping, the cell walls of the starch granules are ready to be attacked by the action of the enzymes, contained in the malt infusion and the hops at a pH close to neutral.

The action to raise the temperature of the rice-slurry and to reduce the size of the starch particles at the same time, is done in the following manner:

The three way valve 5 is opened, the feed control 6 is set for synchronized flow, and the combination fluid reduction mill 7 and booster pump 8 is set in motion. As the rice-slurry flows into the Venturi flash tube 9, the steam valve 10 is opened, to force the slurry through the flash tube nozzle 11. When the entire slurry has reached the temperature of 50–52 R. the malt infusion is pumped up, from the main malt mash tank 12 with the infusion pump 13 through the 4 inch line 14c into the cooker vessel A, with agitator 2 in motion, observing a 10–12 minute saccharification. With the diastatic power of the malt infusion active for the purpose of efficient conversion, the entire rice mash is circulated through the fluid reduction mill, pump and Venturi tube, raising the temperature with little steam from valve 10 to 55–56 R. for liquefaction. The ground, seedless hop infusion, saturated with $CO_2$ gas is dropped from the pressurized 50 gallon hop infusion tank 16. A little $CO_2$ is used to remove all hop particles from the same tank from the $CO_2$ line 17. The feeder line 18 is used to blow the ground, seedless hop charge from the hop grinder, located in the hop-storage room, to the hop infusion tank 16 containing fresh water.

The cooker vessel A is then pressurized by closing all valves and the man-hole 19. Due to the increase of pressure, due to the $CO_2$ and the heat present, air escapes through the pressure-regulator and blow-off 20, thus eliminating oxidation and excessive foaming of the mash.

Steam is admitted by opening valve 15 through the injectors 15a, 15b, 15c, and 15d until the pressure reaches 15–18 lbs. and a temperature slightly over the boiling point is obtained. This boiling action is maintained for 30 minutes, instead of the old practice which requires an hour. Temperatures and pressures of the different points are observed at the control board 26. Samples for the pH control and conversion reactions are taken from pet cock 27, with the container A adjusted for atmospheric or higher pressure. Overall reactions can be observed thru the sight glasses 28 and 28b.

The hydrolized mash is then ready to be incorporated with the main malt mash at protein rest in tank 12. To transfer the hydrolized cooked mash, the three-way valve 5 is then changed for direct down flow through line 14c to the main mash tank 12. Previous to this the pressure on the cooker vessel is reduced.

The sparger 21 with water heated at mixer 22, and flowing through the two way valve 22b, washes the remainder of the cooker mash down and apparatus is then ready for the next charge. To cool off the cooker vessel for adjustments or cleaning, cold water is obtained from the same station 22 and 22b.

The sprayer 23 serves to inject water-steam or the catalyst fluid nitrogen, to increase the flow of the slurry-mash, through the flash tube 11, amplifying the effect of rupturing the starch particles and the coagulation of the protein matters. It also serves to overcome oxydation, foaming and scorching of the pasty mash at this point and at the flash tubes. Cover 24 can be opened to permit the cleaning of the venturi and the flash tubes. The scouring of the entire system is done with warm salt water.

The entire process consists of steeping, fluid grinding and acceleration of the cooking of a brewers' cereal mash, in line with the conventional conversion of grain starch, as practiced in the breweries. The advantages are the elimination of double handling of material, the several possible arrangements of either upright or horizontal, and the synchronizing of the milling and cooking system, using comparatively little space. The ground-meal hopper, long conveyor systems causing dust and infestation by insects, also the old mill, which needed much power and attention, are no longer necessary. One more important feature is the refining process, obtained by absorbing the green organic impurities, and the prevention of concentrating crude matters, besides ash, all of which cause undersirable flavors in the final beer. Some of the hops constituents have and are capable of attracting the unstable proteins of the entire mash in tank 12 and quite some scum in the form of an upper dough, can be removed. This exacting operation will be of benefit to the yeast, in the form of refined nutrient. With some refining at the initial stages, the practice of skimming can be omitted, as traces of undesirable matters can be removed by straining with activated carbon. The fermenting power of clean yeast is higher, the ripening period for the beer will be shorter, and the final product, will emerge as a fine wholesome and mellow drink, with a good and stable foam.

From the foregoing it is seen that a combination of using the improved equipment and application of a brewers' cereal cooker with fluid milling and flash reduction, has been described, which has a systematized flow eliminating rehandling of the broken grains, for the grinding and steeping prior to dextrination; also with the transfer of the slurry and mash for the reaction periods, accelerated by the use of the venturi and flash discharge, thus shortening the entire cooking time considerably.

The time of steeping has been reduced, as I achieve the same effect of swelling and subsequent rupture of the starch with the use of my heat vapor system, through the effect of passage by way of the Venturi tube and flash heads, the grain cells exploding into a vessel of lower pressure.

The saving of power over dry milling of the broken grains at the brewery is evident.

The taste of the beer is improved due to the absence of the thermal inactivation of lipase, and the prevention of concentrating crude ash forming matters, which cause undesirable flavors.

These exacting operations will be of benefit, to the maintaining of the fermentation rate of the yeast, receiving refined nutrients.

The ripening of the beer during storage will be achieved in a shorter time, and the final product will emerge as a fine, wholesome and mellow drink, with a good and stable foam.

The structure of the milling reduction is well known per se. It has a metal woven wire conveyor belt and a solid metal plate or plates, with a contact between rollers and plates sufficient for wet crushing of starch grains. Below the plate is a low pressure steam injector. The middle roller is corrugated. It has an outlet, between the leading lines indicating 7.

I wish it to be understood that I do not desire to be limited to the exact details of construction shown and described, for obvious modifications will occur to a person skilled in the art.

I claim:

1. In a cereal cooker having a closed tank for cooking the grains and with a stirrer therein at its lower part, the combination of a Venturi tube at the upper part of the tank having an inlet and outlet, a flash discharge outlet within the tank and connected with the outlet of the Venturi tube, and a connection between the inlet end of Venturi tube and the lower end of the tank, whereby the contents of the tank are discharged from the flash discharge outlet into the tank at considerable speed and at a pressure higher than the pressure in the tank.

2. The structure of claim 1 and a fluid grinder, connected with the lower end of the tank to receive its contents and with the inlet end of the Venturi tube.

3. The structure of claim 1 and a steam supply at the inlet end of the Venturi tube.

FERDINAND MULLER

REFERENCES CITED

The following references are of record in the file of this patent:

UNITED STATES PATENTS

| Number | Name | Date |
| --- | --- | --- |
| 1,781,435 | Carper | Nov. 11, 1930 |
| 2,278,701 | Kayr | Apr. 7, 1942 |
| 2,490,980 | Peterson | Dec. 13, 1949 |

FOREIGN PATENTS

| Number | Country | Date |
| --- | --- | --- |
| 3,998 | Great Britain | Feb. 24, 1894 |
| 575,198 | Germany | Aug. 25, 1931 |